United States Patent Office 3,179,611
Patented Apr. 20, 1965

3,179,611
PETROLEUM WAX COMPOSITIONS
Eugene E. Richardson, Highland, Ind., assignor to Standard Oil Company, Chicago, Ill., a corporation of Indiana
No Drawing. Filed Dec. 23, 1960, Ser. No. 77,827
3 Claims. (Cl. 260—28.5)

This invention relates to petroleum wax compositions. More particularly it relates to paraffin wax compositions of improved gloss stability containing small amounts of hydrocarbon soluble polyethylene.

Paraffin wax is principally used today as a coating for paper or paper-board products. Waxed paper has the special attribute of being very resistant to moisture transfer. So it is used as an outerwrap for many packages to protect the contents thereof either from absorption of or loss of moisture therefrom. Consequently, the gloss characteristics of waxed paper is of special importance when such paper is used as an overwrap in the packaging of many products. Gloss is very important when waxed paper has been color printed, for such paper is usually used as packaging material for products which are sold in self-service stores. Therefore appearance is critical. Waxed paper having good initial gloss can normally be prepared by applying a film of wax to the paper at a temperature well above the wax melting point and cooling very rapidly by immersion in cold water. However, such waxed paper while having good initial gloss often loses it after a few days or weeks. Further, any tendency to lose gloss is usually accentuated by varying storage temperatures. The modification of wax to inhibit the loss of the gloss of wax paper is therefore of value.

Many materials have been added to wax in recent years to improve one or more of its functional properties. For example, polyethylene has been found to be a beneficial additive for improving many of the functional properties of paraffin wax, one of which is maintenance of the gloss of waxed paper. However, the addition of polyethylene to paraffin wax has created new problems. By way of illustration, it has been found that the storage stability of polyethylene in wax compositions is poor. That is to say that when the polyethylene-wax product is stored in bulk the polyethylene tends to settle out. Also, such wax-polyethylene compositions have much greater viscosities than wax from which made. Consequently, the application of such compositions to paper is rendered more difficult. Another problem is the formation of haze or cloud in the wax-polyethylene compositions. Molten paraffin wax is normally clear. However, as has been described in the literature and patents during recent years, polyethylene is insoluble or immiscible with most of the well-known chemicals and is difficult to incorporate into wax. Consequently, normal polyethylene-wax compositions are heterogeneous and being heterogeneous have differential solidification temperatures. That is to say, that when such compositions are prepared at elevated temperatures, the cooling thereof causes the polyethylene to solidify at a temperature above the melting point of the wax. The temperature at which initial precipitation occurs is referred to as the cloud point. Such compositions are hazy for the polyethylene is dispersed as small particles in the wax at temperatures between the cloud point and solidification temperature of the blend. Haze is undesirable for the blend must be kept at temperatures at least 15° F. above the cloud point at the time of application. Otherwise the coating will be nucleated and discontinuous and of greater opacity due to the small polyethylene particles. As a consequence of these problems, the wax and paper industries have been seeking means for producing homogeneous polyethylene-wax compositions which will be haze free and not exhibit cloud, have stability during storage, be free of viscosity increase, and retain gloss.

Now, in accordance with the present invention, it has been found that gloss-unstable paraffin waxes are substantially improved with respect to gloss, cloud, storage stability, and viscosity by the incorporation therein of a gloss stabilizing amount of a hexane-soluble polyethylene. More particularly, the present invention comprises wax products predominating in paraffin waxes having melting points within the range of from about 120° F. to about 150° F. and a minor amount of at least 0.01% of a hexane-soluble polyethylene, preferably about 0.2% to about 10%.

Polyethylene now denotes a family of ethylene polymers differing widely in molecular weights, crystallinity, viscosity, specific gravity, and other properties. The polyethylene suitable for the production of the wax products according to the present invention is that fraction of polymerized ethylene which is soluble in hexane; and hereinafter referred to in the specification and claims as "hexane-soluble" polyethylene. It has been found that commercial polyethylenes contain varying amounts of hexane-soluble material. Ethylene polymerization processes produce polyethylene of varying molecular weights, varying from amorphous low molecular weight material— commonly referred to as "grease"—to very crystalline products of high molecular weight. It has been found that the low molecular weight product heretofore deemed undesirable and waste in polymerization processes contains a fraction that is soluble in hexane. Consequently, the grease is a valuable source of hexane-soluble polyethylene for use in the present invention and presents a means for utilizing a type of polyethylene heretofore deemed uneconomical.

The major component of the wax products of the present invention comprise crystalline or paraffin waxes having melting points of from about 120° F. to about 150° F. and preferably from about 130° F. to about 140° F.

In the following examples which are illustrative of the present invention, gloss stability was determined in accordance with the procedure published in TAPPI, vol. 37, p. 400, No. 9, September 1954. Briefly, initial gloss of a waxed paper specimen is measured by percent light reflectance. The specimen is then stored at 72° F. and 50% relative humidity for seven days after which percent light reflectance is again measured. Stability is determined by change in percent reflectance. The less the change, the greater the stability.

*Example I*

One hundred grams of a low molecular weight polyethylene, commercially available under the trade name Petrothene 200, was added to two hundred milliliters of hexane and refluxed for six hours at atmospheric pressure. The mixture was cooled and filtered. The filtrate was then heated and the hexane evaporated, leaving eight grams of hexane-soluble polyethylene.

*Example II*

One hundred fifty grams of AC 6 polyethylene (molecular weight about 5500) was added to two liters of hexane and refluxed for six hours. After filtration and evaporation of the hexane, twenty-five grams of hexane-soluble polyethylene was obtained.

*Example III*

Two hundred grams of Epolene N polyethylene (molecular weight about 3500) treated with two liters in the manner of Example I yielded 20 grams of hexane-soluble polyethylene.

*Example IV*

Three hundred grams of AC G201 polyethylene extracted with two liters hexane gave 50 grams of hexane-soluble polyethylene.

Each of the hexane-soluble polyethylenes obtained in the preceding examples was tested in varying concentrations in a paraffin wax having a melting point of 137° F.

*Example V*

Blending of the wax and hexane-soluble polyethylene was accomplished by simply heating the materials to 150° F. with moderate agitation until all portions were liquid. It was found that there was substantially no change in viscosity of the polyethylene-wax blends over the viscosity of the base wax. For example, when 10% of the hexane-soluble polyethylene obtained from the AC 6 polyethylene was added to the 137° F. M.P. wax having a viscosity of 46.5 SSU at 210° F., the wax-polyethylene blend viscosity was 47 SSU. But, when 10% of AC 6 was added to the same wax, the viscosity of the blend was so high that a measurement could not be made.

Other functional properties such as blocking point, pick point, sealing and tensile strengths were substantially unchanged when the hexane-soluble polyethylene was added to paraffin waxes. No cloud point or haze was found in any of the test blends at any temperature above the melting point of the wax.

Gloss stability of hexane-soluble polyethylene-wax blends was determined and the results were:

| Hexane-soluble polyethylene of Example— | Percent | Gloss | |
|---|---|---|---|
| | | Initial | 7 days |
| I | 0.3 | 28 | 26 |
| II | 0.2 | 31 | 28 |
| III | 0.2 | 33 | 30 |
| IV | 0.2 | 34 | 30 |
| None | | 31 | 14 |

The gloss stability of the hexane-soluble polyethylene-wax compositions of the present invention has been shown to have been significantly improved. It is now possible to produce homogeneous wax-polyethylene compositions that do not have the disadvantages of the prior art. Nor is there any necessity for special methods of preparation, such as heating the mixture to temperatures above 210° F. or resorting to milling and then heating to elevated temperatures to get the polyethylene dispersed in the wax.

Percentages given herein and in the claims are weight percentages unless otherwise stated.

Although the present invention has been described with reference to specific embodiments thereof, the invention is not to be considered as limited thereto but includes within its scope such modification and variations as come within the spirit of the claims.

I claim:

1. A wax composition consisting essentially of a homogeneous mixture of a paraffin wax having a melting point of from about 120 to about 150° F. and from 0.01 to about 10% of hexane-soluble polyethylene, said polyethylene being the hexane soluble fraction of solid low molecular weight polyethylene obtained by the fractionation of said low molecular weight polyethylene in refluxing hexane at atmospheric pressure, said wax composition having improved gloss stability, and substantially the same viscosity and melting points of said paraffin wax.

2. The composition of claim 1 wherein the melting point of said paraffin wax is from about 130 to about 140° F.

3. A method of preparing homogeneous polyethylene-paraffin wax compositions having improved gloss-stability and substantially the same viscosity and melting points of the paraffin wax, which method comprises blending a molten paraffin wax having a melting point of from about 120 to 150° F. with from 0.01 to about 10% hexane-soluble polyethylene, said polyethylene being the hexane soluble fraction of solid low molecular weight polyethylene obtained by the fractionation of said low molecular weight polyethylene in refluxing hexane at atmospheric pressure.

References Cited by the Examiner

UNITED STATES PATENTS

| 2,706,719 | 4/55 | Newberg et al. | 260—28.5 |
| 2,842,508 | 7/58 | Sterk | 260—28.5 |
| 2,882,246 | 4/59 | Leatherman et al. | 260—28.5 |

OTHER REFERENCES

Kresser: Polyethylene, 1957, Reinhold Publishing Corp., N.Y., page 77.

MORRIS LIEBMAN, *Primary Examiner.*

ALPHONSO D. SULLIVAN, *Examiner.*